US011981121B2

(12) United States Patent
Castells De Monet et al.

(10) Patent No.: US 11,981,121 B2
(45) Date of Patent: May 14, 2024

(54) HEATING PRINT AGENT ON PRINT MEDIA

(71) Applicant: HEWLETT-PACKARD DEVELOPMENT COMPANY, L.P., Spring, TX (US)

(72) Inventors: Raimon Castells De Monet, Sant Cugat del Valles (ES); Josep Tarradas I Juan, Sant Cugat del Valles (ES); Marco Ignacio Barbetta, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/767,577

(22) PCT Filed: Nov. 5, 2019

(86) PCT No.: PCT/US2019/059806
§ 371 (c)(1),
(2) Date: Apr. 8, 2022

(87) PCT Pub. No.: WO2021/091533
PCT Pub. Date: May 14, 2021

(65) Prior Publication Data
US 2024/0100863 A1 Mar. 28, 2024

(51) Int. Cl.
*B41J 11/00* (2006.01)
*B41F 23/04* (2006.01)

(52) U.S. Cl.
CPC ..... *B41J 11/00218* (2021.01); *B41F 23/0406* (2013.01)

(58) Field of Classification Search
CPC ................ B41J 11/002; B41J 11/00214; B41J 11/00218; B41M 23/0406; B41M 23/045
See application file for complete search history.

(56) References Cited

U.S. PATENT DOCUMENTS

| | | | | |
|---|---|---|---|---|
| 5,754,208 | A | 5/1998 | Szlucha | |
| 6,233,398 | B1 | 5/2001 | Rutherford | |
| 6,340,225 | B1 * | 1/2002 | Szlucha | B41J 29/377 101/424.1 |
| 6,428,158 | B1 * | 8/2002 | Szlucha | B41J 11/00244 347/102 |

(Continued)

FOREIGN PATENT DOCUMENTS

| | | |
|---|---|---|
| EP | 0771661 B1 | 7/2001 |
| JP | S-56118880 A | 9/1981 |
| JP | S-58197069 A | 11/1983 |

(Continued)

*Primary Examiner* — Anh T Vo

(57) ABSTRACT

Examples relate to methods to heat a print agent deposited on a print agent, print an image on a print media and heating systems for a heating a print agent deposited on a print media. A heating system comprises a radiation emitter to irradiate a print agent deposited on a print media, a reflector to reflect a radiation emitted by the radiation emitter back to the radiation emitter, and a displacing member to shift the heating system between a pre-heating position wherein the radiation reflected back to the radiation emitter has a higher magnitude and a heating position wherein the radiation reflected back to the radiation emitter has a lower magnitude.

15 Claims, 5 Drawing Sheets

(56) References Cited

U.S. PATENT DOCUMENTS 6,536,894 B1 * 3/2003 Rasmussen .......... B41J 11/0024
400/120.01

FOREIGN PATENT DOCUMENTS

| | | | |
|---|---|---|---|
| JP | 2000056607 | A | 2/2000 |
| JP | 3408787 | B2 | 5/2003 |
| JP | 3993985 | B2 | 10/2007 |
| JP | 2008257946 | A | 10/2008 |
| KR | 100923044 | B1 | 10/2009 |

* cited by examiner

HEATING PRINT AGENT ON PRINT MEDIA

BACKGROUND

In printing processes, heat may be applied to a print agent deposited on a print media. For example, heat may be used for drying, curing, sublimating or fixing a print agent deposited on a print media. Heating systems may be used for heating the print agent on the print media.

BRIEF DESCRIPTION OF THE DRAWINGS

Various example features will be apparent from the detailed description which follows, taken in conjunction with the accompanying drawings, wherein.

DETAILED DESCRIPTION

Printing an image on a print media may involve delivering a print agent on the print media with a print head of a printing system. Heat may be applied to this delivered or deposited print agent in some printing processes. The print agent on the print media may be heated by conduction, convection or radiation or a mixed of any of them. For example, a heating system having a radiation emitter may heat a print agent on the print media.

Figure 1A:
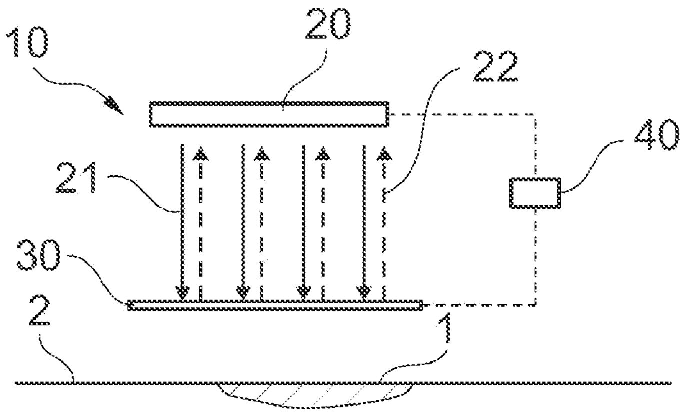
FIG. 1*a* and FIG. 1*b* respectively illustrate a heating system for heating a print agent deposited on a print media in a pre-heating position and in a heating position according to an example of the present disclosure.
Figure 1B:
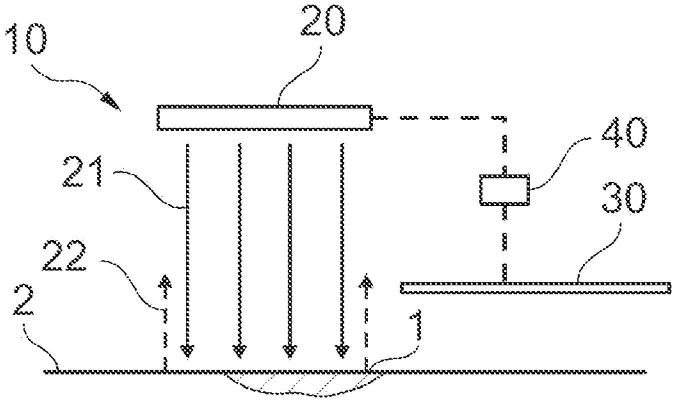

FIG. 1*a* and FIG. 1*b* respectively illustrate a heating system 10 for heating a print agent 1 deposited on a print media 2 in a pre-heating position and in a heating position according to an example of the present disclosure. The heating system 10 comprises a radiation emitter 20 to irradiate a print agent 1 deposited on a print media 2 and a reflector 30 to reflect a radiation emitted by the radiation emitter 20 back to the radiation emitter 20. The heating system 10 further comprises a displacing member 40 to shift the heating system 10 between a pre-heating position (FIG. 1*a*) wherein the radiation reflected back to the radiation emitter 20 has a higher magnitude and a heating position (FIG. 1*b*) wherein the radiation reflected back to the radiation emitter 20 has a lower magnitude.

In these figures, the radiation emitter emits a radiation 21. A reflected back radiation 22 is an amount of the radiation emitted 21 by the radiation emitter reflected back to the radiation emitter. In FIG. 1*a*, the reflector 30 may reflect back an amount of the radiation 21 emitted by the radiation emitter 20. In FIG. 1*b*, an amount of the radiation 21 emitted by the radiation emitter may be reflected back by for example the print media. The reflector 30 may increase the amount or the magnitude of reflected back radiation 22. The magnitude of reflected back radiation 22 is thus higher when the heating system is in a pre-heating position (FIG. 1*a*) than in a heating position (FIG. 1*b*). The reflector may thus block an amount of the radiation emitted by the radiation emitter and may substantially redirect this amount of the radiation emitted towards the radiation emitter.

The reflected back radiation 22 may heat the radiation emitter 20. An amount of the radiation emitted by the radiation emitter before reaching a predetermined temperature may be used for heating the radiation emitter. Time and energy for achieving a predetermined temperature for heating the deposited print agent may thus be reduced. Energy efficiency of the heating system may thus be increased. Irradiating the print agent may involve the radiation emitter to reach a predetermined temperature. As time for warming up the radiation emitter may be reduced, time for starting a print job may consequently be shortened. Printing efficiency may thus be increased.

In FIG. 1*a* the reflector 30 substantially covers a front face of the radiation emitter 20 when the heater system 10 is in the pre-heating position. Reflection towards the radiation emitter may be enhanced. In FIG. 1*b* the reflector 30 does not substantially impede the radiation travelling towards the print agent when the heater system is in the heating position. Accordingly, the quantity of radiation reflected back towards the radiation emitter when the heating system is in the heating position is lower than when the heating system is in the pre-heating position.

In some examples, the magnitude of the radiation reflected back to the radiation emitter when the heating system is in the pre-heating position may be between 1.25 and 250 times higher than the radiation reflected back to the radiation emitter when the heating system is in the heating position. In some examples, the magnitude of the radiation reflected back when the heating system is in the pre-heating position may be between 2 and 200 times higher than the radiation reflected back when the heating system is in the heating position. In some examples, the magnitude of the radiation reflected back when the heating system is in the pre-heating position may be between 3 and 100 times higher than the radiation reflected back when the heating system is in the heating position.

In some examples, an inner side of the reflector, i.e. a surface of the reflector 30 facing the radiation emitter 20 in the pre-heating position, may comprise a reflectance higher than 95% for a given radiation range, e.g. for a radiation in the infrared spectrum. The print media and the print agent on the print media may comprise a reflectance between 5% and 60% for this given radiation range. Reflectance of a surface is its effectiveness in reflecting radiant energy. Reflectance of a surface may depend on the wavelength of the incident radiation. An amount of the radiation reflected by the print agent or the print media may be directed to the radiation emitter and a remaining amount may be directed to surrounding elements of the radiation emitter. In some examples, less than a half of the radiation reflected by the print agent or the print media may be directed towards the radiation emitter.

In some examples, the displacing member 40 may be to move the radiation emitter 20 with respect to the reflector 30. In some examples, the displacing member 40 may cause a rotation of the radiation emitter 20 with respect to reflector 30. In some examples, the displacing member 40 may linearly displace the radiation emitter 20 with respect to the reflector 30. In some examples, the displacing member 40 may rotate and linearly displace the radiation emitter 20 with respect to the reflector 30.

In some examples, the displacing member 40 may be to move the reflector 30 with respect to the radiation emitter 20. In some examples, the displacing member 40 may cause a rotation of the reflector 30 with respect to radiation emitter 20. In some examples, the displacing member 40 may linearly displace the reflector 30 with respect to the radiation emitter 20. In some examples, the displacing member 40 may rotate and linearly displace the reflector 30 with respect to the radiation emitter 20.

In some examples, the displacing member 40 may connect the radiation emitter 20 to the reflector 30.

Printing processes may comprise heating. For example, a print agent on a print media may be irradiated by a heating system. Examples of heating in printing process may be drying, curing, sublimating or fixing. These heating processes may involve warming up the radiation emitter to a predetermined temperature before irradiating the print agent.

Some printing processes may include a drying process in which a print agent, e.g. ink, is heated to a temperature higher than a drying temperature to accelerate the evaporating of solvent fluids and leave the pigments on the print media. The drying temperature may depend on the type of print agent. In some examples, a drying temperature for a given print agent, e.g. ink, may be between 50° C. and 100° C. In some examples, a drying temperature may be between 50° C. and 80° C. Heating the print agent to a temperature higher than a drying temperature may involve a radiation emitter at a temperature higher than a predetermined temperature. In some examples, this predetermined temperature of the radiation emitter may be similar or higher than the drying temperature of the print agent.

Some printing processes may comprise curing the print agent ejected onto the print media. Some print agents may comprise a solvent liquid, a pigment and latex particles. The solvent liquid, e.g. water-based solvent, may be evaporated in a drying process. Then, in a curing process, the print agent may be irradiated and the latex particles may be melt to form a film that encapsulates the pigment. A radiant emitter may provide energy for curing the print agent after the radiant emitter reaches a predetermined temperature. In some examples, curing a print agent may involve heating the radiant emitter to a temperature between 90° C. and 150° C.

In a sublimation printing process, a print agent, e.g. ink, may be converted from a solid to a gaseous state to penetrate into a print media and may then be fixed on the print media to form an image. The print agent may be heated at a sublimation temperature or above to convert it to gas which permeates fibers of some print media, e.g. fibers of a fabric. The gas may be again converted to a solid state when the temperature drops and the print agent may thus be absorbed and integrated into the print media, e.g. integrated into the fibers of a fabric. In some examples, a sublimation temperature of the print agent may be between 150° C. and 250° C. In some examples, a sublimation temperature of the print agent may be between 170° C. and 220° C. In some examples, the print agent may be heated to a temperature at or above the sublimation temperature of the print agent. Heating a print agent at a sublimation temperature or above may involve warming up the radiant emitter to a temperature higher than a predetermined temperature. In some examples, this predetermined temperature may be a sublimation temperature or above for a given print agent.

The print media is a material capable of receiving a print agent. In some examples, a print media may be a textile material. Textile materials may comprise cotton or polymers, e.g. polyester. In some examples, the print media may be a sheet of paper or cardboard or a plastic material.

In some examples, the heating system 10 may be integrated in a printing system. A printing system may comprise a heating system according to any of the examples herein disclosed.

In some examples, the heating system may be independent from the printing system. For example, the heating system may be adjacent to the printing system.

A printing system comprises a print head which may deliver print agent onto a print media which may advance along an advancing direction. The print head may be provided with a plurality of nozzles to deliver print agent, e.g. ink, onto the print media to form an image. In this disclosure, depositing print agent on a print media includes firing, ejecting, spitting or otherwise delivering print agent onto the print media.

In some examples, the print head may travel repeatedly across a scan axis for delivering print agent onto a print media advancing along the advancing direction.

In some examples, the print head may be static. The plurality of nozzles may be distributed within the print head along the width of the print media. Such an arrangement may allow most of the width of the print media to be printed simultaneously. These printer systems may be called as page-wide array (PWA) printer systems.

In some examples, the heating system may be positioned after the print head with respect to the advancing direction of the print media. In some examples, the heating system may be integrated with the print head, e.g. in movable or in fixed print heads. This may be the case in heating for drying a print agent.

In some examples, a printing system may comprise a plurality of heating systems according to any of the examples herein disclosed. For example, page-wide array printer systems may comprise a plurality of heating systems distributed along the width of the print media.

In some examples, the radiation emitter may emit radiation in a relatively narrow band. Light-emitting diodes (LED's) or laser diodes are examples of radiation emitters with a relatively narrow band.

In some examples, the radiation emitter may emit radiation in a relatively wide band, e.g. in the whole infrared spectrum. A radiation emitter emitting in a wide band may involve higher heating up times.

In some examples, the radiation emitter may emit infrared (IR) radiation. Infrared radiation has a wavelength between 700 nm and 1 mm. In some examples, the radiation emitter may emit ultraviolet (UV) radiation. Ultraviolet radiation has a wavelength between 10 nm and 400 nm.

In some examples, a processor may control the operation of the heating system, e.g. shifting between a pre-heating and a heating position. The processor may be coupled to a non-transitory machine readable storage medium. In some examples, the processor may be an application specific processor for the heating system. In some examples, the processor may be integrated in a printing system.

In some examples, the heating system may comprise a sensor for obtaining the temperature of the radiation emitter. The sensor may be communicatively connected to a processor for shifting between the heating and the pre-heating position in function of the obtained temperature.

Figure 2:
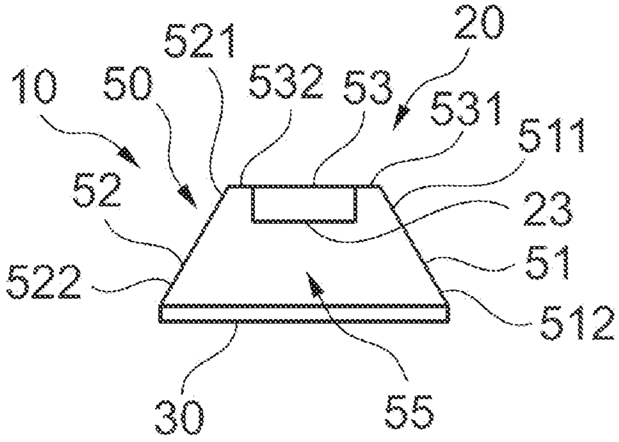
FIG. 2 illustrates a heating system for heating a print agent deposited on a print media in a pre-heating position according to an example of the present disclosure.

FIG. 2 illustrates a cross-sectional view of a heating system 10 in the pre-heating position according to one example of the present disclosure. The heating system 10 comprises a radiation emitter 20, a reflector 30 and a displacing member (not illustrated in FIG. 2).

The radiation emitter 20 of this figure comprises a heating element 23 and a housing 50 accommodating the heating element 23. The housing 50 of FIG. 2 comprises an opening 55 to allow a radiation to pass through the opening 55. The housing 50 may protect the heating element 23 and may help to concentrate the radiation emitted by the heating element 23.

In FIG. 2, the housing 50 comprises a rear wall 53, a first sidewall 51 and a second sidewall 52. The first sidewall 51 and the second sidewall 52 may outwardly extend from opposite ends of the rear wall 53. The first sidewall 51 may extend from a first end 531 of the rear wall 53 and the second sidewall 52 may extend from a second end 532 of the rear wall 53.

The first sidewall 51 may comprise a rear end 511 and a distal end 512. The rear end 511 of the first sidewall 51 may be connected to the first end 531 of the rear wall 53. The second sidewall 52 may comprise a rear end 521 and a distal end 522. The rear end 521 of the second sidewall 52 may be connected to the second end 532 of the rear wall 53.

In some examples, a distance between the distal ends 512, 522 of the sidewalls may be higher than a distance between the rear ends 511, 521 of the sidewalls.

In FIG. 2 the reflector 30 comprises a shape corresponding to the opening 55. In this figure, the reflector 30 extends from the distal end 512 of the first sidewall 51 to a distal end 522 of the second sidewall 52. Isolation of the radiation emitter may thus be enhanced and heating of the radiation emitter may consequently be accelerated. In addition, temperature of elements surrounding the radiation emitter may be reduced.

In some examples, the reflector may comprise a shape greater than the shape of the opening.

In some examples, the reflector may comprise a first and a second member. The first second may connected to the distal end of the first sidewall and the second member to the distal end of the second sidewall. In some examples, the first and the second members may slide with respect to the sidewalls of the radiation emitter for opening and closing the opening of the housing. In some examples, the first member of the reflector may rotate about the first sidewall and the second member of the reflector may rotate about the second sidewall. Rotation of the first and the second members may allow opening and closing the opening of the housing and, consequently, may cause the heating system shifting between a pre-heating position to a heating position. The displacing member may connect the first and the second members of the reflector to the housing of the radiation emitter.

In some examples, the heater element may comprise an electrical resistance to produce heat. Electricity may pass through the electrical resistance which is heated up.

In some examples, the heater element may comprise an infrared heater element. The infrared heater element may be an electrical infrared heater element. An infrared heater element may emit electromagnetic radiation with wavelength from 700 nm to 1 mm.

In some examples, the infrared heater element may comprise wire that generates radiant heat energy when electrical current is conducted by the wire, causing it to become heated. The wire may comprise, for example, tungsten, alloys of iron or aluminum. In some examples, the wire may be coiled to increase the radiation surface and to increase the uniformity of the radiation.

In some examples, the infrared heater element may comprise infrared heater lamps. In some examples, an infrared heater lamp may comprise an incandescent lamp comprising a quartz tube filled with pressurized inert gas. The wire, e.g. a tungsten wire, may be surrounded by the quartz tube.

In some examples, the infrared heater elements may comprise ceramic infrared heating elements.

In some examples, the heater element may comprise an ultraviolet heater element. An ultraviolet heater element may emit electromagnetic radiation with wavelength from 10 nm to 400 nm.

In some examples, the ultraviolet heater element may comprise an ultraviolet lamp. In some examples, the ultraviolet heater element may comprise an ultraviolet LED. In some examples, the ultraviolet heater element may comprise an ultraviolet laser.

In some examples, the heating element may comprise a diode laser which generates laser radiation through a semiconductor. In some examples, laser diodes may emit electromagnetic radiation in specific wavelength ranges comprised in the infrared band. For example, a Nd: YAG laser is an example of a diode laser emitting at a wavelength of 808 nm.

In some examples, the heating element may comprise a LED or a plurality of LED's. LED's may emit a radiation similar to diode lasers.

In some examples, the heating system may comprise a plurality of heater elements. For example, a plurality of heater elements, e.g. infrared heater elements, may be accommodated in a housing.

In some examples, reflector may comprise an inner side facing the radiation emitter, e.g. the heating element, when the heating system is in the pre-heating position. The inner side of the reflector may comprise a reflectance higher than 95% for a given radiation. In some examples, the inner side may comprise a reflectance higher than 95% for a radiation in the infrared spectrum. In some examples, the inner side of the reflector may comprise a reflectance higher than 95% for a radiation in the ultraviolet spectrum. Amount of radiation reflected back towards the radiation emitter may thus be increased.

In some examples, the inner side of the reflector may comprise an aluminium coating, e.g. a polished aluminium coating. The aluminium coating may comprise a reflectance higher than 95% for an infrared radiation. In some examples, the reflector may comprise a steel plate coated with aluminum. Heating up of the radiation emitter may be accelerated in a cost-effective way.

In some examples, the housing may comprise an inner surface. For example, the rear wall 53, the first sidewall 51 and the second sidewall 52 of FIG. 2 comprises an inner surface. The inner surface of the housing may comprise a reflectance lower than a reflectance of the inner side of the reflector for a given wavelength. For example, for an infrared radiation, the inner side of the reflector may have a reflectance higher than 95% and the inner surface of the radiation emitter may have a reflectance between 30% and 50%. An overheating of the housing of may be prevented.

Figure 3A:
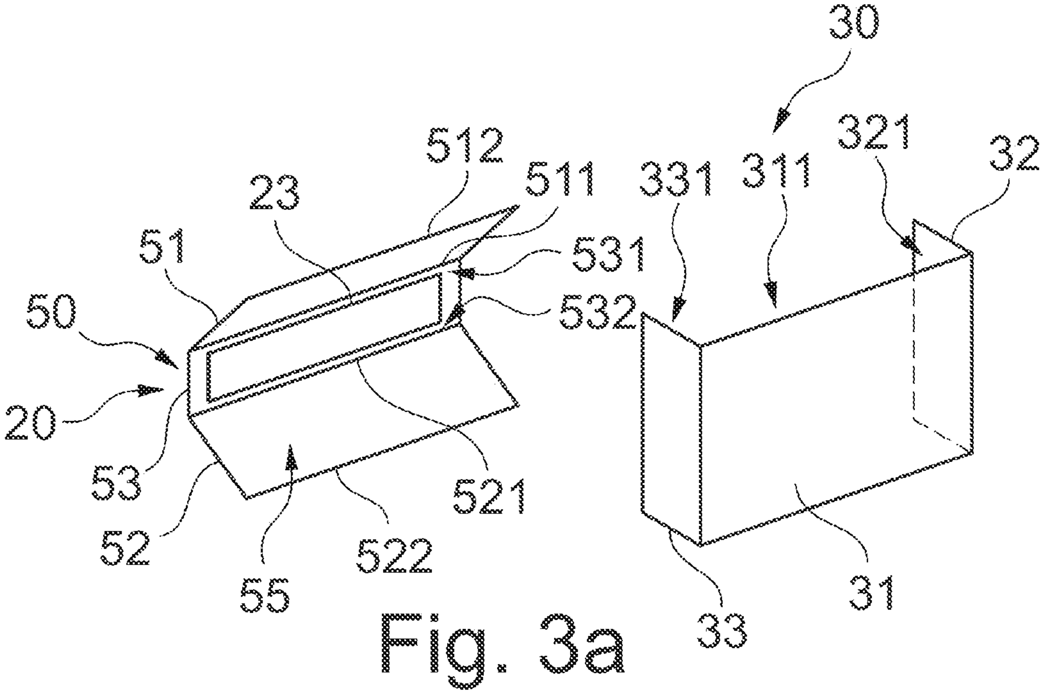
FIG. 3*a* illustrates an isometric exploded view of a radiation emitter and a reflector of a heating system according to an example of the present disclosure.
Figure 3B:
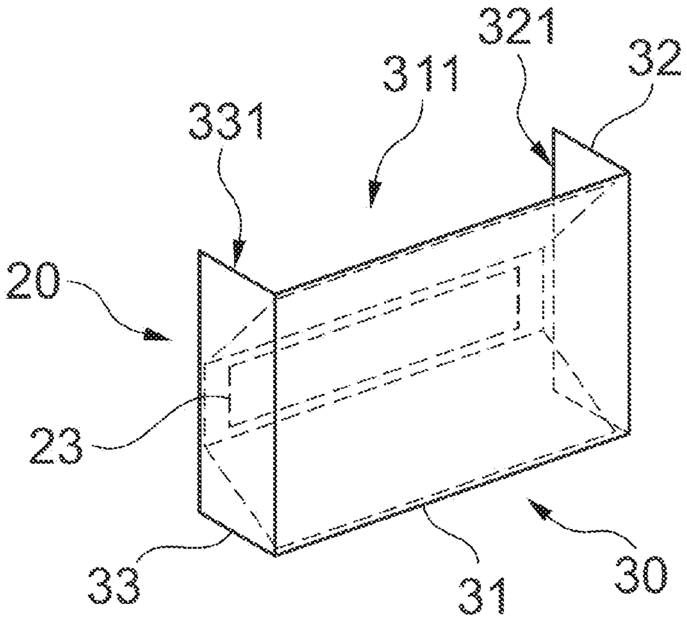
FIG. 3*b* illustrates the radiation emitter and the reflector of FIG. 3*a* in a pre-heating position.

FIG. 3*a* illustrates an isometric exploded view of a radiation emitter and a reflector 30 of a heating system according to an example of the present disclosure. FIG. 3*b* illustrates the radiation emitter 20 and the reflector of FIG. 3*a* in a pre-heating position.

The radiation emitter 20 of these figures may be according to any of the examples herein described with respect to FIG. 2. In this respect, the radiation emitter 20 may comprise a housing 50 with an opening 55. The opening 55 may be defined by a rear wall 53, a first sidewall 51 and a second sidewall 52. The first sidewall 51 may extend from a rear end 511 at a first end 531 of the rear wall 53 to a distal end 512. The second sidewall 52 may extend from a rear end 521 at a second end 532 of the rear wall 53 to a distal end 522.

The reflector 30 of these figures comprises a central plate 31 and two lateral plates 32 and 33. The right 32 and the left 33 lateral plates of these figures extend from opposite ends of the central plate 31. The lateral plates may be substantially perpendicular to the central plate 31. In some examples, the lateral plates 32 and 33 may be rotatably connected to the central plate 31 to engage a radiation emitter.

The reflector may comprise an inner side according to any of the examples herein disclosed facing the radiation emitter when the heating system is in the pre-heating position.

In FIG. 3*b*, an inner side 311 of the central 31 faces the heating element 23 and extends from the distal end 512 of the first sidewall 51 to the distal end 522 of the second sidewall 52 of the housing of the radiation emitter. The right 32 and the left 33 lateral plates of these figures comprise inner sides 321 and 331 facing the heating element 23. In some examples, the inner sides of the reflector may comprise a reflectance higher than 95% for a given radiation.

The reflector may substantially engage the housing 50 of the radiation emitter to substantially enclose the heating element 23 when the heating system is in the pre-heating position. In FIG. 3*b* the lateral sides 32 and 33 of the reflector 30 extend towards the rear plate 53 of the radiation emitter 20 surround the radiation emitter when the heating system is in the pre-heating position. These lateral sides may enhance the reflection towards the radiation emitter. Heating rates may thus be increased.

Figure 4:
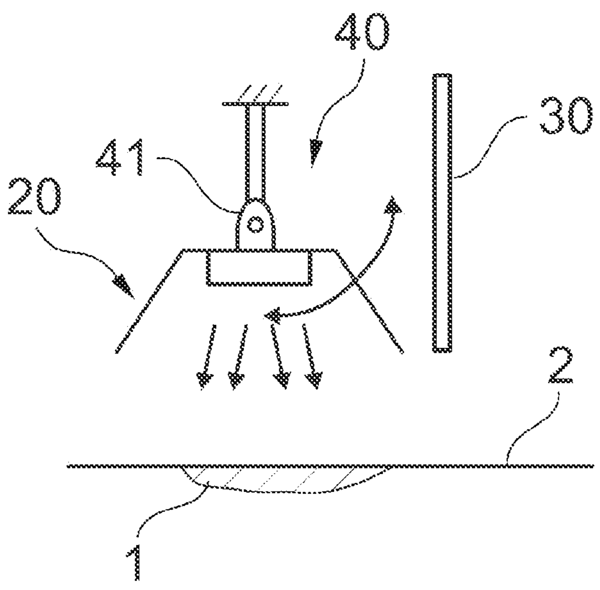
FIG. 4 illustrates a heating system for heating a print agent deposited on a print media according to an example of the present disclosure.

FIG. 4 illustrates a heating system for heating a print agent deposited on a print media according to an example of the present disclosure. The heating system of this figure comprises a radiation emitter 20, a reflector 30 and a displacing member 40.

The radiation emitter and the reflector may be according to any of the examples herein disclosed. In some examples, the displacing member may comprise rotating mechanism to rotate one of the reflector and the radiation emitter about the other.

In this example, the radiation emitter 20 may be moved with respect to the reflector 30 between a pre-heating position and a heating position. The displacing member 40 of this figure comprises a rotating mechanism 41 to rotate the radiation emitter 20 about the reflector.

In some examples, the rotating mechanism may rotatably connect the radiation emitter to the reflector.

In some examples, the rotating mechanism 41 may comprise a hinge connecting the radiation emitter, e.g. a housing, to a fixed structure or to the reflector. In some examples, the rotating mechanism 41 may comprise a ball joint to connect the radiation emitter to a fixed structure.

In this figure, the heating system is in the heating position as the radiation emitter is irradiating a print agent 1 deposited on a print media 2. In this example, the radiation emitter is rotated 90° from a pre-heating position to a heating position. In some examples, the radiation emitter may rotate between 30° and 180° for shifting between the pre-heating position and the heating position.

Radiation emitted by the radiation emitter 20 in the heating position may be substantially perpendicular to the print media. In the pre-heating position, the radiation emitter 20 may substantially irradiate the reflector 30 to increase the temperature of the radiation emitter. Radiation emitted by the radiation emitter 20 in the pre-heating position may be substantially parallel to print media.

In some examples, the reflector may be moved with respect to the radiation emitter between a pre-heating position and a heating position. The displacing member may comprise a rotating mechanism to rotate the reflector about the radiation emitter. The rotating mechanism allowing the rotation of the reflector about the radiation emitter may be according to any of the herein disclosed with respect to the rotating mechanism for rotating the radiation emitter about the reflector. For example, the rotating mechanism may rotatably connect the reflector to the radiation emitter.

Figure 5:
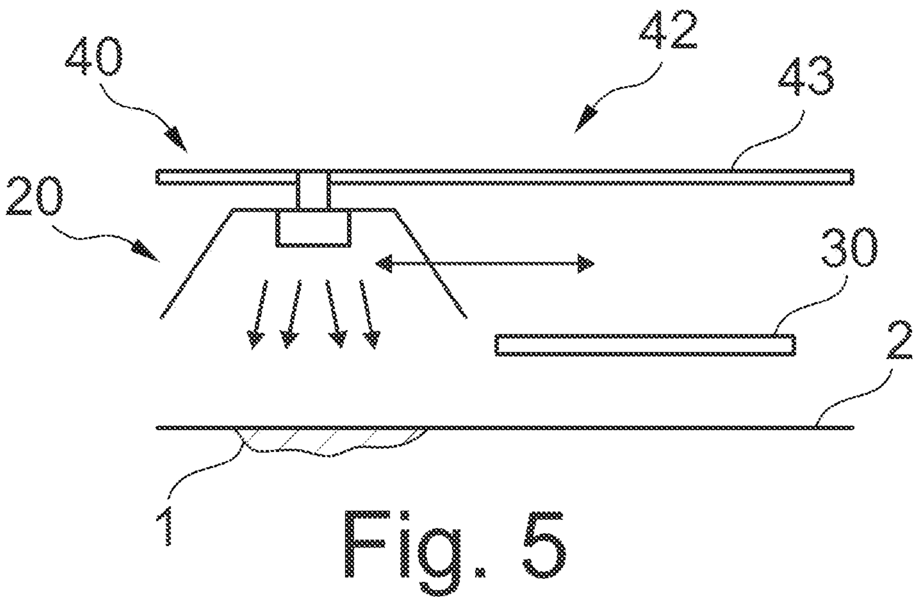
FIG. 5 illustrates a heating system for heating a print agent deposited on a print media according to an example of the present disclosure.

FIG. 5 illustrates a heating system for heating a print agent deposited on a print media according to an example of the present disclosure. The heating system of this figure comprises a radiation emitter 20 and a reflector 30 according to any of the examples herein described. In this figure, the radiation emitter is irradiating a print agent 1 deposited on a print media 2.

The displacing member 40 of this figure comprises a linear mechanism 42 to linearly displace the radiation emitter 20 with respect to the reflector 30. The displacing member 40 of this figure may thus be to move or displace the radiation emitter 20 with respect to the reflector 30.

In some examples, the displacing member may comprise a linear mechanism to linearly displace or move the reflector with respect to the radiation emitter. In these examples, the displacing member may thus be to move or displace the reflector with respect to the radiation emitter.

In some examples, the reflector may be slidably connected to the radiation emitter.

In the example of FIG. 5, the linear mechanism 42 comprises a guide 43. The radiation emitter may slide along the guide 43 to shift the heating system between a pre-heating position and a heating position. In this figure, the radiation emitter may be displaced along a direction substantially parallel to the print media 2.

In some examples, the linear mechanism may comprise a telescopic bar to adjust the position of the radiation emitter with respect to the reflector. In some examples, the linear mechanism may comprise a racket and a pinion mechanism.

In some examples, a linear mechanism may displace the reflector with respect to the radiation emitter to substantially cover a front face of the radiation emitter when the heating system is in the pre-heating position. For example, the reflector may slide along a guide to move between a heating and a pre-heating position.

In some examples, the displacing member may comprise a rotating mechanism and a linear mechanism to move one of the reflector and the radiation emitter with respect to the other one.

In some examples, the displacing member may comprise an articulated robot arm. In some examples, the reflector may be connected to an articulated robot arm. In some examples, the radiation emitter may be connected to an articulated robot arm.

Figure 6:
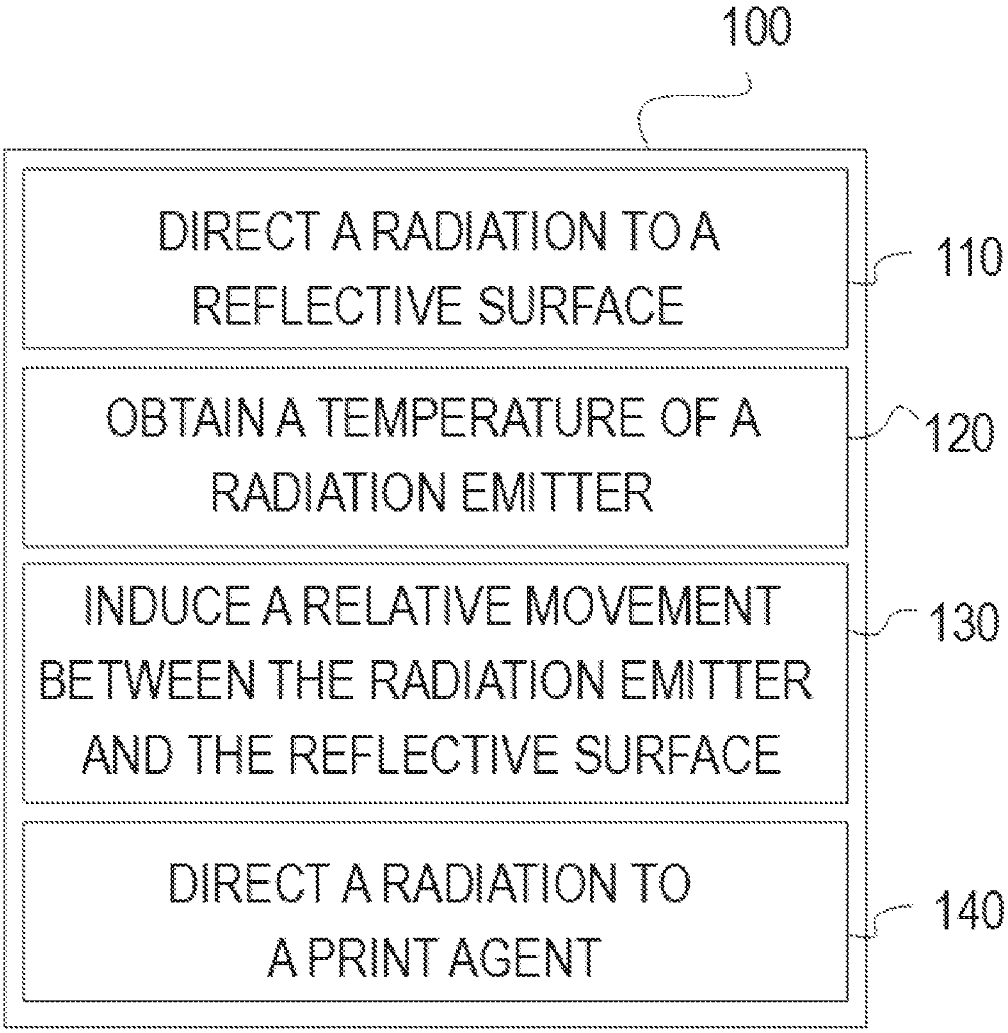
FIG. 6 represents an example of a non-transitory machine-readable storage medium according to the present disclosure.

FIG. 6 represents an example of a non-transitory machine-readable storage medium 100 according to the present disclosure.

The non-transitory machine readable storage medium 100 is encoded with instructions which, when executed by a processor, cause a heating system for a printing system to direct a radiation from a radiation emitter to a reflective surface for redirecting an amount of the radiation towards the radiation emitter as represented at block 110, obtain a temperature of the radiation emitter as represented at block 120, induce a relative movement between the radiation emitter and the reflective surface when the temperature of the radiation emitter is higher than a predetermined temperature to reduce the amount of radiation redirected towards the radiation emitter as represented at block 130 and direct a radiation from the radiation emitter to a print agent deposited on a print media as represented at block 140.

The heating system may be according to any of the examples herein disclosed.

The non-transitory machine readable storage medium 100 may be coupled to a processor.

The processor may perform operations on data. In an example, the processor is an application specific processor, for example a processor dedicated to control the heating system. The processor may also be a central processing unit for a printing system.

The non-transitory machine readable storage medium 100 may include any electronic, magnetic, optical, or other physical storage device that stores executable instructions. The non-transitory machine-readable storage medium 100 may be, for example, Random Access Memory (RAM), an Electrically-Erasable Programmable Read-Only Memory (EEPROM), a storage drive, an optical disk, and the like.

At block 110, the non-transitory machine readable storage medium encoded with instructions may cause to direct a radiation towards a reflective surface of a reflector for reflecting back an amount of the radiation emitted. In some examples, the non-transitory machine readable storage medium may cause the reflective surface to be positioned in front of the radiation emitter. In some examples, the non-transitory machine readable storage medium may cause the radiation emitter to be positioned facing the reflective surface in such a way that the reflective surface may substantially cover a front portion of the radiation emitter.

As represented at block 120, a temperature of the radiation emitter may be obtained. A sensor may obtain the temperature of the radiation emitter. The processor may obtain data from this sensor. In some examples, the obtained temperature may be compared to a predetermined temperature. The processor may execute instructions to compare the obtained temperature to a predetermined temperature.

An obtained temperature being higher than the predetermined temperature may represent that the radiation emitter has reached a temperature suitable for irradiating a print agent deposited on a print media. As represented at block 130, when the obtained temperature is higher than the predetermined temperature, the non-transitory machine readable storage medium induces a relative movement between the radiation emitter and the reflective surface to reduce the amount of radiation redirected towards the radiation emitter. The heating system may thus be moved from a pre-heating position to a heating position. In the pre-heating position, the heating system warming up until reaching a predetermined temperature, e.g. a temperature suitable for directing a radiation to a print agent.

In some examples, inducing a relative movement between the radiation emitter and the reflective surface may comprise moving the radiation emitter with respect to the reflective surface. In some examples, inducing a relative movement between the radiation emitter and the reflective surface may comprise moving the reflective surface with respect to the radiation emitter.

The instructions encoded in the non-transitory machine readable storage medium for the processor represented at blocks 110, 120, 130 and 140 may participate in efficiently heating a print agent deposited in a print media.

Figure 7:
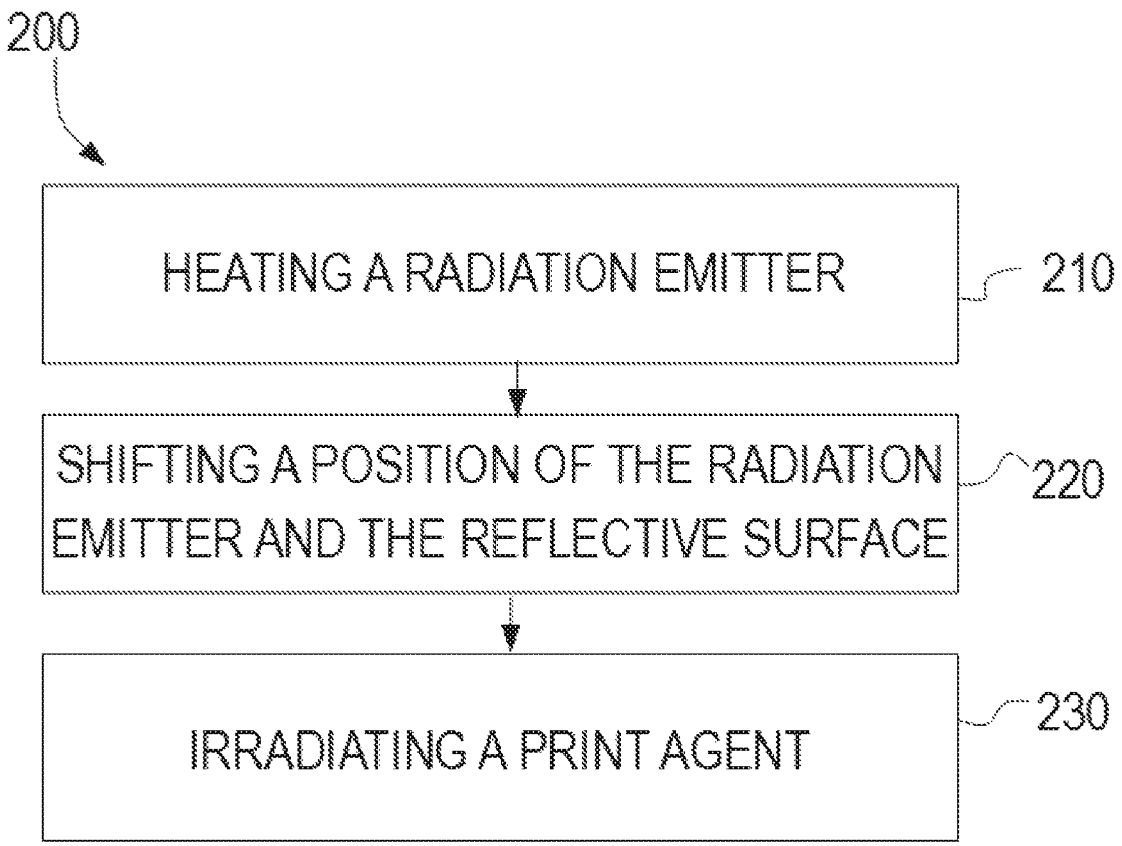
FIG. 7 is a block diagram of an example of a method to heat a print agent deposited on a print media.

FIG. 7 is a block diagram of an example of a method to heat a print agent deposited on a print media. The method 200 comprises heating 210 a radiation emitter by reflecting with a reflective surface an amount of a radiation emitted by the radiation emitter back to the radiation emitter. An amount of radiation emitted by a radiation emitter is reflected back by a reflective surface, e.g. of a reflector, to the radiation emitter so as to heat the radiation emitter. The radiation emitter may thus receive an amount of the radiation previously emitted by the radiation emitter.

The method 200 further comprises shifting 220 a position of the radiation emitter and the reflective surface to reduce the reflected amount of radiation, when the radiation emitter reaches a predetermined temperature. As the radiation redirected back to the radiation emitter heats the radiation emitter, reaching a predetermined temperature may be shortened.

In some examples, shifting a position of the radiation emitter and the reflective surface may comprise moving the radiation emitter with respect to the reflective surface.

In some examples, shifting a position of the radiation emitter and the reflective surface may comprise moving the reflective surface with respect to the radiation emitter.

The radiation emitter or the reflective surface, e.g. a reflector, may be moved with respect to the other according to any of the examples herein disclosed.

In some examples, the method may comprise obtaining a temperature of the radiation emitter. A processor may compare the obtained temperature and a predetermined temperature. If the obtained temperature is higher than the predetermined temperature, the heating system may shift a position of the radiation emitter and the reflective surface. Otherwise, the reflective surface may continue reflecting a high amount of radiation to the radiation emitter.

In addition, the method 200 comprises irradiating 230 a print agent deposited on a print media. In some examples, irradiating a print agent may comprise heating the print agent at a drying temperature or above. In some examples, irradiating a print agent may comprise heating the print agent at a sublimation temperature or above.

In some examples, the method may comprise shifting a position of the radiation emitter and the reflective surface to increase the reflected amount of radiation after irradiating a print agent on a print media. A temperature of the radiation emitter may be maintained in a certain temperature range after heating a print agent on a print media. Temperature may be maintained under certain limits when the radiation emitter is not directly irradiating a print agent on print media. Accordingly, time for reaching a predetermined temperature for irradiating a different print agent may be reduced. Time between print jobs may be reduced. Printing efficiency may thus be increased.

The preceding description has been presented to illustrate and describe certain examples. Different sets of examples have been described, these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any.

The invention claimed is:

1. A heating system for heating a print agent deposited on a print media, the heating system comprising:

a radiation emitter to irradiate a print agent deposited on a print media;

a reflector to reflect a radiation emitted by the radiation emitter back to the radiation emitter; and a displacing member to shift the heating system between a pre-heating position wherein the radiation reflected back to the radiation emitter has a higher magnitude and a heating position wherein the radiation reflected back to the radiation emitter has a lower magnitude.

2. The heating system according to claim 1, wherein the reflector substantially covers a front face of the radiation emitter when the heater system is in the pre-heating position.

3. The heating system according to claim 1, wherein the radiation emitter comprises:

a heating element; and a housing accommodating the heating element, the housing having an opening to allow a radiation to pass through the opening.

4. The heating system according to claim 3, wherein the housing comprises a rear wall, a first sidewall and a second sidewall, the first and the second sidewalls outwardly extending from opposite ends of the rear wall.

5. The heating system according to claim 4, wherein the reflector extends from a distal end of the first sidewall to a distal end of the second sidewall when the heating system is in the pre-heating position.

6. The heating system according to claim 4, wherein the reflector comprises a central plate and two lateral plates extending from opposite ends of the central plate.

7. The heating system according to claim 6, wherein the lateral sides of the reflector extend towards the rear plate of the housing to surround the radiation emitter when the heating system is in the pre-heating position.

8. The heating system according to claim 1, wherein the displacing member is to move the radiation emitter with respect to the reflector.

9. The heating system according to claim 1, wherein the displacing member is to move the reflector with respect to the radiation emitter.

10. The heating system according to claim 1, wherein the displacing member comprises a rotating mechanism to rotate one of the reflector and the radiation emitter about the other.

11. A method to heat a print agent deposited on a print media comprising:

heating a radiation emitter by reflecting with a reflective surface an amount of a radiation emitted by the radiation emitter back to the radiation emitter; and shifting a position of the radiation emitter and the reflective surface to reduce the reflected amount of radiation, when the radiation emitter reaches a predetermined temperature; and irradiating a print agent deposited on a print media.

12. The method of claim 11, wherein shifting a position of the radiation emitter and the reflective surface comprises moving the radiation emitter with respect to the reflective surface.

13. The method of claim 11, wherein shifting a position of the radiation emitter and the reflective surface comprises moving the reflective surface with respect to the radiation emitter.

14. The method of claim 11 comprising shifting a position of the radiation emitter and the reflective surface to increase the reflected amount of radiation after irradiating a print agent deposited on a print media.

15. A non-transitory machine readable storage medium encoded with instructions which, when executed by a processor, cause a heating system for a printing system to:

direct a radiation from a radiation emitter to a reflective surface for redirecting an amount of the radiation towards the radiation emitter;

obtain a temperature of the radiation emitter;

induce a relative movement between the radiation emitter and the reflective surface when the temperature of the radiation emitter is higher than a predetermined temperature to reduce the amount of radiation redirected towards the radiation emitter; and direct a radiation from the radiation emitter to a print agent deposited on a print media.

* * * * *